(12) United States Patent
Warth et al.

(10) Patent No.: US 10,634,219 B2
(45) Date of Patent: Apr. 28, 2020

(54) GEAR MECHANISM FOR A MOTOR VEHICLE, AND DRIVE TRAIN FOR A MOTOR VEHICLE COMPRISING SUCH A GEAR MECHANISM

(71) Applicant: ZF Friedrichshafen AG, Friedrichshafen (DE)

(72) Inventors: Viktor Warth, Friedrichshafen (DE); Uwe Griesmeier, Markdorf (DE); Martin Brehmer, Tettnang (DE); Peter Ziemer, Tettnang (DE); Johannes Kaltenbach, Friedrichshafen (DE); Stefan Beck, Eriskirch (DE); Raffael Kuberczyk, Ravensburg (DE); Michael Wechs, Weißensberg (DE); Stephan Scharr, Friedrichshafen (DE); Eckehard Münch, Bünde (DE); Bernd Knöpke, Salem (DE); Matthias Horn, Tettnang (DE); Jens Moraw, Friedrichshafen (DE); Julian King, Rankweil (AT); Juri Pawlakowitsch, Kressbronn (DE); Gerhard Niederbrucker, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 46 days.

(21) Appl. No.: 15/776,450

(22) PCT Filed: Nov. 10, 2016

(86) PCT No.: PCT/EP2016/077323
§ 371 (c)(1),
(2) Date: May 16, 2018

(87) PCT Pub. No.: WO2017/089143
PCT Pub. Date: Jun. 1, 2017

(65) Prior Publication Data
US 2018/0328466 A1   Nov. 15, 2018

(30) Foreign Application Priority Data
Nov. 25, 2015 (DE) .......... 10 2015 223 297

(51) Int. Cl.
*F16H 3/66* (2006.01)
*B60K 6/48* (2007.10)
(Continued)

(52) U.S. Cl.
CPC ............ *F16H 3/66* (2013.01); *B60K 6/365* (2013.01); *B60K 6/48* (2013.01); *B60K 6/547* (2013.01);
(Continued)

(58) Field of Classification Search
CPC ................... F16H 3/66; B60K 6/365
See application file for complete search history.

(56) References Cited

U.S. PATENT DOCUMENTS

| 6,572,507 B1 | 6/2003 | Korkmaz et al. | |
| 8,998,762 B2 * | 4/2015 | Griesmeier | B60K 6/48 475/5 |

(Continued)

FOREIGN PATENT DOCUMENTS

| DE | 19912480 A1 | 9/2000 |
| DE | 10315710 A1 | 10/2004 |

(Continued)

OTHER PUBLICATIONS

German Search Report DE102015223297.2 dated Aug. 3, 2016, (6 pages).

(Continued)

*Primary Examiner* — Derek D Knight
(74) *Attorney, Agent, or Firm* — Dority & Manning, P.A.

(57) ABSTRACT

A transmission (G) for a motor vehicle includes an input shaft (GW1), an output shaft (GW2), three planetary gear sets (P1, P2, P3), as well as four shift elements (B1, K1, K2, K3). By selective engagement of the four shift elements (B1, K1, K2, K3) in pairs, six forward gears (1-6) are shiftable between the input shaft (GW1) and the output shaft (GW2).

13 Claims, 6 Drawing Sheets

(51) Int. Cl.
  *B60K 6/547*   (2007.10)
  *B60K 6/365*   (2007.10)
  *F16H 3/72*    (2006.01)

(52) U.S. Cl.
  CPC ...... *F16H 3/724* (2013.01); *B60K 2006/4816* (2013.01); *B60Y 2200/92* (2013.01); *F16H 2200/0052* (2013.01); *F16H 2200/201* (2013.01); *F16H 2200/2041* (2013.01); *F16H 2200/2048* (2013.01); *F16H 2200/2097* (2013.01); *Y02T 10/6256* (2013.01)

(56) References Cited

U.S. PATENT DOCUMENTS

| | | |
|---|---|---|
| 2006/0252594 A1 | 11/2006 | Bucknor et al. |
| 2014/0248987 A1 | 9/2014 | Griesmeier et al. |
| 2018/0328465 A1* | 11/2018 | Warth .................. B60K 6/48 |

FOREIGN PATENT DOCUMENTS

| | | |
|---|---|---|
| DE | 102012212257 A1 | 3/2013 |
| DE | 102011084010 A1 | 4/2013 |
| DE | 102012220517 A1 | 5/2014 |

OTHER PUBLICATIONS

International Search Report (English Translation) PCT/EP2016/077323, dated Jan. 10, 2017. (2 pages).

\* cited by examiner

|   | B1 | K1 | K2 | K3 |
|---|----|----|----|----|
| 1 | x  |    | x  |    |
| 2 | x  | x  |    |    |
| 3 | x  |    |    | x  |
| 4 |    | x  |    | x  |
| 5 |    |    | x  | x  |
| 6 |    | x  | x  |    |

Fig. 3

|    | B1 | K1 | K2 | K3 | K4 | K5 | B2 |
|----|----|----|----|----|----|----|----|
| 1  | x  |    | x  |    | x  | x  |    |
| 2  | x  | x  |    |    | x  | x  |    |
| 3  | x  |    |    |    | x  | x  |    |
| 4  |    | x  |    | x  | x  | x  |    |
| 5  |    |    | x  | x  | x  | x  |    |
| 6  |    | x  | x  | x  | x  | x  |    |
| R1 | x  |    | x  |    |    |    | x  |

Fig. 5

GEAR MECHANISM FOR A MOTOR VEHICLE, AND DRIVE TRAIN FOR A MOTOR VEHICLE COMPRISING SUCH A GEAR MECHANISM

FIELD OF THE INVENTION

The invention relates generally to a transmission for a motor vehicle, and to a drive train for a motor vehicle including such a transmission.

BACKGROUND

Patent application DE 199 12 480 A1, which belongs to the applicant, describes an automatic transmission for motor vehicles, which includes three planetary gear sets as well as three brakes and two clutches for shifting six forward gears.

SUMMARY OF THE INVENTION

As used herein, a transmission means, in particular, a multi-stage transmission, in which a multitude of gears, i.e., fixed transmission ratios between two shafts of the transmission, are preferably automatically shiftable by shift elements. In this case, the shift elements are clutches or brakes, for example. Such transmissions are utilized primarily in motor vehicles in order to adapt the rotational speed and torque output characteristic of the drive unit to the driving resistances of the vehicle in a suitable way.

In order to reduce the design complexity, example aspects of the invention provide a transmission including three planetary gear sets, which can likewise generate three forward gears, by a total of four shift elements.

The transmission according to the invention includes an input shaft, an output shaft, three planetary gear sets, as well as a first, a second, a third, and a fourth shift element. One planetary gear set includes a sun gear, a carrier, and a ring gear. Rotatably mounted on the carrier are planetary gears which intermesh with the tooth system of the sun gear and/or with the tooth system of the ring gear. A negative of minus gear set refers to a planetary gear set including a carrier, on which the planetary gears are rotatably mounted, and including a sun gear and a ring gear, wherein the tooth system of at least one of the planetary gears intermeshes both with the tooth system of the sun gear and with the tooth system of the ring gear, whereby the ring gear and the sun gear rotate in opposite directions of rotation when the sun gear rotates while the carrier is held. A positive or plus gear set differs from the above-described minus planetary gear set in that the plus gear set includes inner and outer planetary gears which are rotatably mounted on the carrier. The tooth system of the inner planetary gears intermeshes, in this case, with the tooth system of the sun gear, on the one hand, and with the tooth system of the outer planetary gears, on the other hand. In addition, the tooth system of the outer planetary gears intermeshes with the tooth system of the ring gear. As a result, the ring gear and the sun gear rotate in the same direction of rotation when the carrier is held.

Each of the three planetary gear sets includes a first, a second, and a third element. The first element is always formed by the sun gear of the respective planetary gear set. In a design as a minus gear set, the second element is formed by the carrier of the respective planetary gear set, and the third element is formed by the ring gear of the respective planetary gear set. In a design as a plus gear set, the second element is formed by the ring gear of the respective planetary gear set, and the third element is formed by the carrier of the respective planetary gear set. The third planetary gear set is always designed as a minus gear set.

The input shaft is permanently connected to the second element of the first planetary gear set. The input shaft is further either permanently connected or is connectable to the second element of the second planetary gear set. The output shaft is permanently connected to the second element of the third planetary gear set. The first element of the first planetary gear set is permanently rotationally fixed. The third element of the second planetary gear set is permanently connected to the first element of the third planetary gear set.

The third element of the third planetary gear set is rotationally fixable by engaging the first shift element, in that the third element is connected via the first shift element to a rotationally fixed component of the housing, for example to the transmission housing. The second shift element is located in an operative connection between the first element of the second planetary gear set and the output shaft. Yet another shift element can also be located in this operative connection. By engaging the third shift element, the third element of the first planetary gear set is connectable to the first element of the second planetary gear set. The fourth shift element is located in an operative connection between the first element of the second planetary gear set and the third element of the third planetary gear set. Yet another shift element can also be located in this operative connection.

A transmission including this allocation of the individual transmission elements according to the invention has a compact design, low component loads, and good gearing efficiency.

By selective engagement of the four shift elements in pairs, six forward gears are formable between the input shaft and the output shaft. The first forward gear is formed by engaging the first shift element and the third shift element. The second forward gear is formed by engaging the first shift element and the second shift element. The third forward gear is formed by engaging the first shift element and the fourth shift element. The fourth forward gear is formed by engaging the second shift element and the fourth shift element. The fifth forward gear is formed by engaging the third shift element and the fourth shift element. The sixth forward gear is formed by engaging the second shift element and the third shift element. As a result, given a suitable selection of the stationary transmission ratios of the planetary gear sets, a transmission ratio range which is well suited for the application in a motor vehicle is achieved. In addition, two adjacent forward gears always include one shift element which is engaged in both of these gears. This simplifies the gear change operation and shortens the shifting duration between adjacent forward gears. Since the first shift element is engaged in the first to third forward gears, the shift pattern enables a gear shift between each of the first three forward gears, which has been simplified in this manner. This also applies for a gear shift between the forward gears three and five, since the fourth shift element is engaged in these gears. Such a direct gear shift is also possible between the forward gears two and four, and between the forward gears four and six, since the second shift element is engaged in these gears.

In principle, each of the four shift elements can be designed as a form-fit shift element, i.e., for example, as a dog clutch, or as a friction-locking shift element, i.e., for example, as a multi-disk clutch. Preferably, the first shift element is designed as a form-fit shift element. Form-fit shift elements, in the engaged state, establish the connection via positive engagement and, in the disengaged state, are distinguished by lower drag losses than friction-locking shift elements. Due to the low drag losses in the disengaged state, the efficiency of the transmission is improved, in particular since the first shift element is engaged only in the first to third forward gears. When the transmission is utilized in the drive train of a motor vehicle, the first shift element is therefore mostly disengaged in high gears, for example during highway travel. The mechanical efficiency of the motor vehicle drive train can therefore be improved.

According to one possible embodiment, the transmission includes a fifth, sixth, and seventh shift element. By engaging the fifth shift element, the input shaft can be connected to the second element of the second planetary gear set. The sixth shift element is located in the operative connection between the first element of the second planetary gear set and the second shift element. By engaging the seventh shift element, the second element of the second planetary gear set is rotationally fixable. These optional shift elements, five, six, and seven, make it possible to form one reverse gear between the input shaft and the output shaft. A reverse gear is not absolutely necessary in a motor vehicle transmission, since a reverse rotation of the output shaft can also be brought about via an electric motor or machine. If the functionality of the electric machine is not available, however, a reverse gear which can be mechanically formed is advantageous. The reverse gear is formed by engaging the first shift element, the third shift element, and the seventh shift element. The remaining shift elements contributing to the formation of the forward gear are disengaged in this case, including the fifth and the sixth shift elements. The fifth and the sixth shift elements are engaged in the first to sixth forward gears.

Preferably, the sixth and the seventh shift elements are designed as a double-acting constant-mesh shift element. The sixth and the seventh shift elements are therefore designed as form-fit shift elements which can be actuated by a single actuator. If the sixth shift element is engaged, the seventh shift element is disengaged, and vice versa. In a central position, both shift elements can also be disengaged. Such a central position facilitates the shift operation. One example of the structural implementation of such an approach is disclosed in FIGS. 2 to 4 of the patent application DE 101 21 634 A1.

According to a first embodiment, external interfaces of the input shaft and of the output shaft are arranged coaxially to each other and at opposite axial ends of the transmission. Of the three planetary gear sets, the third planetary gear set has the greatest axial separation from the external interface of the input shaft. Such an arrangement is particularly suitable for the application of the transmission in a motor vehicle including a drive train aligned in parallel to the direction of travel of the motor vehicle.

According to a second embodiment, external interfaces of the input shaft and the output shaft are arranged coaxially to each other, wherein, in this case, the third planetary gear set of the three planetary gear sets has the shortest axial separation from the external interface of the input shaft. The external interface of the output shaft includes a tooth system which intermeshes with a tooth system of a shaft arranged axially parallel to the main axis of the transmission. The axle differential of a drive train can be arranged on this shaft, for example. Such an arrangement is particularly suitable for the application of the transmission in a motor vehicle including a drive train aligned transversely to the direction of travel of the motor vehicle.

Preferably, all planetary gear sets are designed as minus gear sets, whereby good mechanical efficiency and a compact design of the transmission are facilitated.

According to one possible embodiment, the transmission includes an electric machine or motor including a rotary rotor and a rotationally fixed stator. In this case, the rotor is permanently connected either to the input shaft or to the third element of the first planetary gear set. In this case, the connection of the rotor to the third element of the third planetary gear set is advantageous, in particular. Since the first element of the first planetary gear set is permanently rotationally fixed and the second element of the first planetary gear set is permanently connected to the input shaft, a gear-independent, fixed ratio results between the input shaft and the third element of the first planetary gear set. In this case, the rotor of the electric machine rotates at a higher speed than the input shaft, in every gear. Therefore, the electric machine can be designed for higher speeds and lower torque, whereby the electric machine can be manufactured smaller and more cost-effectively. In addition, the first planetary gear set contributes to the formation of the gears. Therefore, no additional planetary gear set is required for forming the pre-ratio for the electric machine. The third element of the first planetary gear set also has a rotational speed in every gear. The transmission therefore enables both power output and power uptake by the electric machine, in every gear.

The transmission, including the electric machine, can include a connecting shaft which can be connected to the input shaft of the transmission by a separating clutch. When the transmission is utilized in the motor vehicle, the motor vehicle can be driven solely by the electric machine of the transmission. A transmission-external drive unit, which is connected to the connecting shaft, can be decoupled from the input shaft by the separating clutch. Therefore, this drive unit need not be entrained in the electric mode.

In principle, a starting component can be installed upstream from the transmission, for example a hydrodynamic torque converter or a friction clutch. The starting component can be a component of the transmission. The starting component allows for a starting process when the transmission is utilized in the drive train of a motor vehicle, in that the starting component allows for slip between the internal combustion engine and the output shaft. Preferably, one of the shift elements of the transmission is designed as such a starting component, in that the third shift element is designed as a friction shift element. Due to the slip operation of the third shift element, a starting process is possible in the first forward gear and a starting process is possible in the optional reverse gear. Alternatively thereto, the first shift element can also act as a starting component, wherein the first shift element is to be designed as a friction shift element in this case.

The transmission can be an integral part of a drive train of a motor vehicle. The drive train includes an internal combustion engine in addition to the transmission, which is flexibly connected to the input shaft of the transmission via a torsional vibration damper. A separating clutch, which can be an integral part of the transmission, can be located between the input shaft and the internal combustion engine. The output shaft of the transmission is operatively connected, in a driving manner, to an axle transmission which is connected to wheels of the motor vehicle. If the transmission includes the electric machine, the drive train allows for multiple drive modes of the motor vehicle. In an electric mode, the motor vehicle is driven by the electric machine of the transmission. In an internal combustion engine-operated mode, the motor vehicle is driven by the internal combustion engine. In a hybrid mode, the motor vehicle is driven by both the internal combustion engine and by the electric machine of the transmission.

A permanent connection is referred to as a connection that always exists between two elements. Elements which are permanently connected in such a way always rotate with the same dependence between their speeds. There can be no shift element located in a permanent connection between two elements. A permanent connection is therefore to be distinguished from a shiftable connection.

A permanently rotationally fixed connection is referred to as a connection that always exists between two elements and, therefore, the connected elements in the connection always have the same rotational speed.

The expression "engage a shift element" in the context of gear formation is understood to mean an operation in which the shift element is controlled in such a way that the shift element transmits a high amount of torque at the end of the engagement operation. While form-fit shift elements do not permit a speed differential in the "engaged" state, in the case of friction-locking shift elements in the "engaged" state, a low speed differential can form between the shift-element halves, either intentionally or not.

BRIEF DESCRIPTION OF THE DRAWINGS

Exemplary embodiments of the invention are described in detail in the following with reference to the attached figures.

FIG. 3 shows a shift pattern for the transmission according to the first and the second exemplary embodiments.

FIG. 5 shows a shift pattern for the transmission according to the third exemplary embodiment.

DETAILED DESCRIPTION

Figure 1:
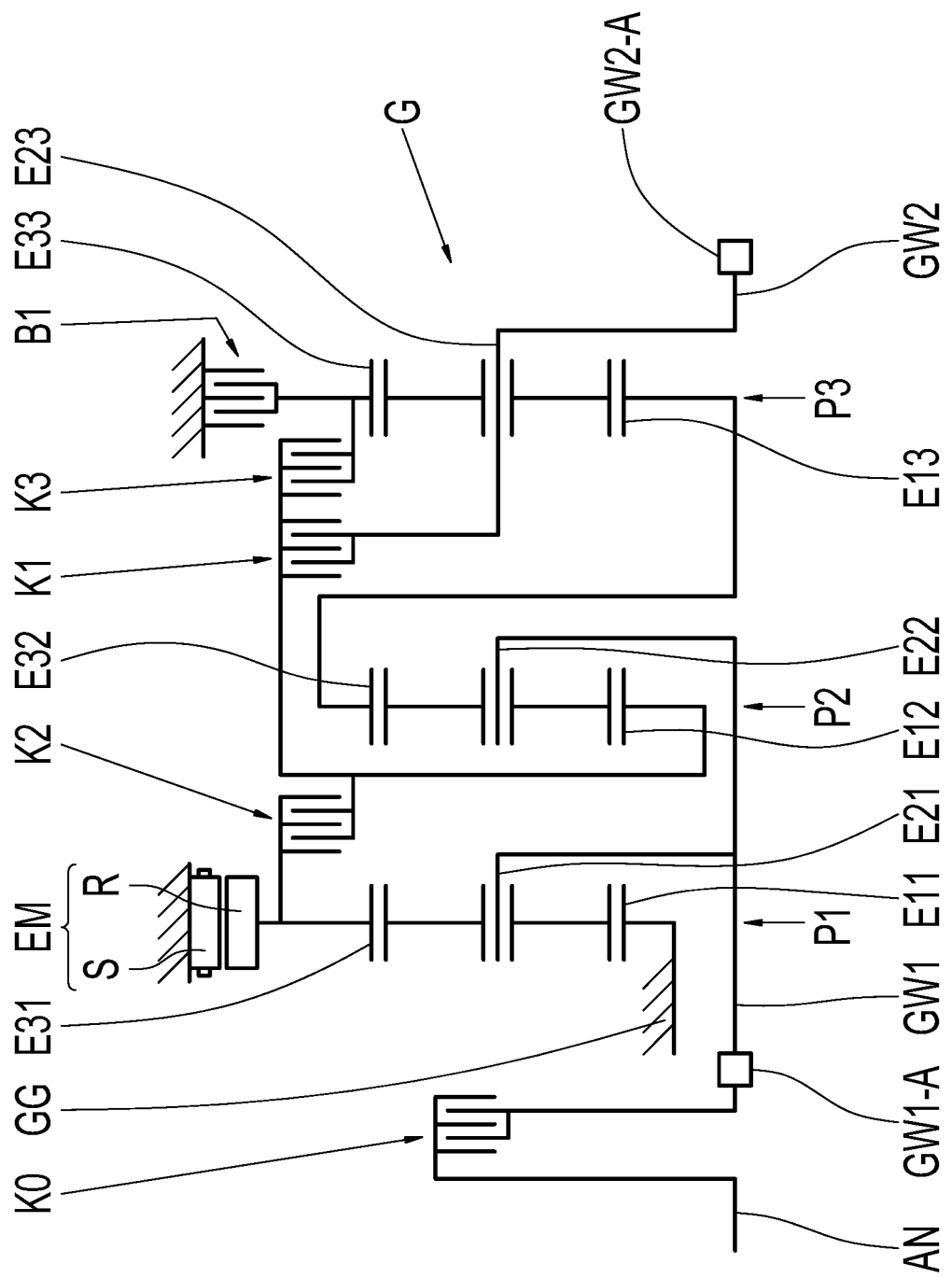
FIG. 1 schematically shows a transmission according to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a transmission G according to a first exemplary embodiment of the invention. The transmission G includes a first planetary gear set P1, a second planetary gear set P2, and a third planetary gear set P3. Each of the three planetary gear sets P1, P2, P3 includes a first element E11, E12, E13, a second element E21, E22, E23, and a third element E31, E32, E33. The first element E11, E12, E13 is always formed by a sun gear of the respective planetary gear set P1, P2, P3. If the planetary gear set is designed as a negative or minus gear set, the second element E21, E22, E23 is formed by a carrier of the respective planetary gear set P1, P2, P3, and the third element E31, E32, E33 is formed by the ring gear of the respective planetary gear set P1, P2, P3. In the embodiment of the transmission G represented in FIG. 1, the planetary gear sets P1, P2, P3 are designed as minus gear sets. If a planetary gear set were designed as a positive or plus gear set, the second element E21, E22, E23 is formed by its ring gear and its third element E31, E32, E33 is formed by its carrier. These plus gear set variants are not represented in the figures, for the sake of clarity.

An input shaft GW1 is permanently connected to the second element E21 of the first planetary gear set P1 and to the second element E22 of the second planetary gear set P2. An output shaft GW2 is permanently connected to the second element E23 of the third planetary gear set P3. External interfaces GW1-A, GW2-A of the input shaft GW1 and the output shaft GW2 are arranged at axially opposite ends of the transmission G. The three planetary gear sets P1, P2, P3 are successively arranged in the following axial sequence: first planetary gear set P1, second planetary gear set P2, third planetary gear set P3. In this case, the first planetary gear set P1 has the axially shortest distance to the external interface GW1-A of the input shaft GW1.

The first element E11 of the first planetary gear set P1 is permanently rotationally fixed, in that it is permanently connected to a rotationally fixed component GG. The rotationally fixed component GG can be formed, for example, by a transmission housing. The third element E32 of the second planetary gear set P2 is permanently connected to the first element E13 of the third planetary gear set P3. The transmission G includes a first shift element B1, a second shift element K1, a third shift element K2, and a fourth shift element K3. By engaging the first shift element B1, the third element E33 of the third planetary gear set P3 is rotationally fixable. By engaging the second shift element K1, the first element E12 of the second planetary gear set P2 is connectable to the second element E23 of the third planetary gear set P3 and, therefore, to the output shaft GW2. The second shift element K1 is therefore located in an operative connection between the first element E12 of the second planetary gear set P2 and the output shaft GW2. By engaging the third shift element K2, the third element E31 of the first planetary gear set P1 is connectable to the first element E12 of the second planetary gear set P2. By engaging the fourth shift element K3, the first element E12 of the second planetary gear set P2 is connectable to the third element E33 of the third planetary gear set P3. The fourth shift element K3 is therefore located in an operative connection between the first element E12 of the second planetary gear set P2 and the third element E33 of the third planetary gear set P3.

The transmission G can optionally include an electric machine or motor EM which includes a rotationally fixed stator S and a rotary rotor R. In this case, the rotor R is permanently connected either to the input shaft GW1 or to the third element E31 of the first planetary gear set P1. If the transmission G includes the electric machine EM, the transmission G can include a separating clutch K0, by which the input shaft GW1 can be decoupled from a connecting shaft AN. If the output shaft GW2 is driven by the electric machine EM, a transmission-external drive unit, which is connected to the connecting shaft AN, can be decoupled from the input shaft GW1 by disengaging the separating clutch K0.

Figure 2:
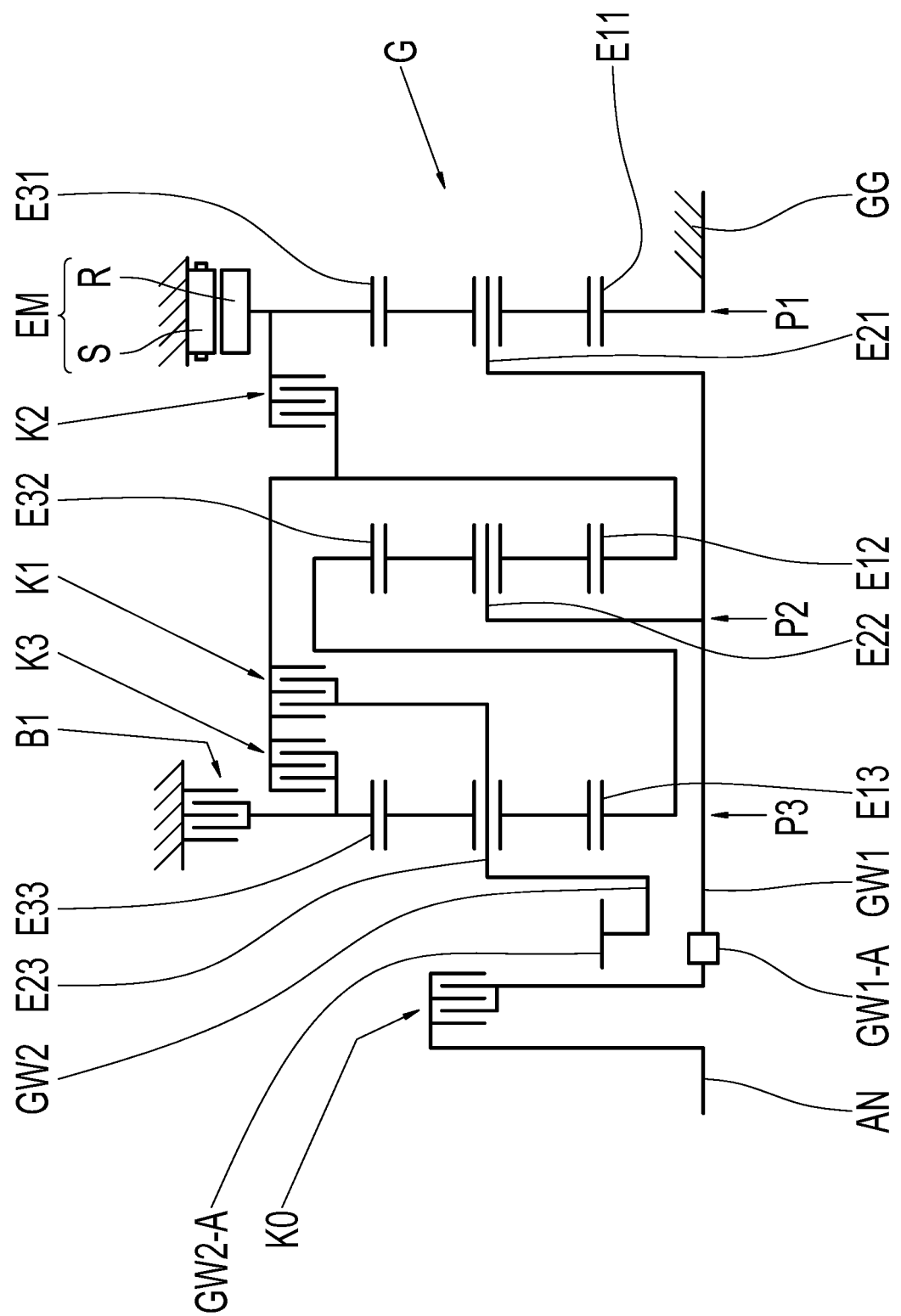
FIG. 2 schematically shows a transmission according to a second exemplary embodiment of the invention.

FIG. 2 schematically shows a transmission G according to a second exemplary embodiment of the invention, which essentially corresponds to the first exemplary embodiment represented in FIG. 1. Only the arrangement of the three planetary gear sets P1, P2, P3 has been changed, and therefore the third planetary gear set P3 now has the shortest axial separation from the interface GW1-A of the input shaft GW1. The external interfaces GW1-A, GW2-A of the input shaft GW1 and the output shaft GW2 are now arranged in the area of the same axial end of the transmission G. The external interface GW2-A of the output shaft GW2 includes a tooth system which intermeshes with a tooth system of a shaft arranged axially parallel to the main axis of the transmission G. Therefore, the transmission G is particularly suitable for the application in a drive train oriented transversely to the direction of travel of a motor vehicle.

Figure 3:
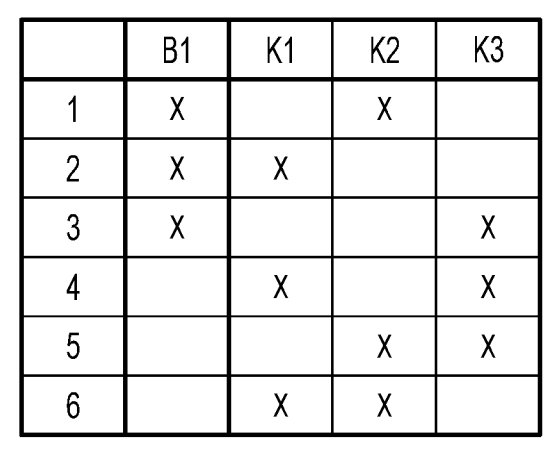

FIG. 3 shows a shift pattern for the transmission G, which applies both for the first and for the second exemplary embodiment. Six forward gears 1 to 6 are indicated in the rows of the shift pattern. In the columns of the shift pattern, an X indicates which of the shift elements B1, K1, K2, K3 is engaged in which forward gear 1 to 6.

Figure 4:
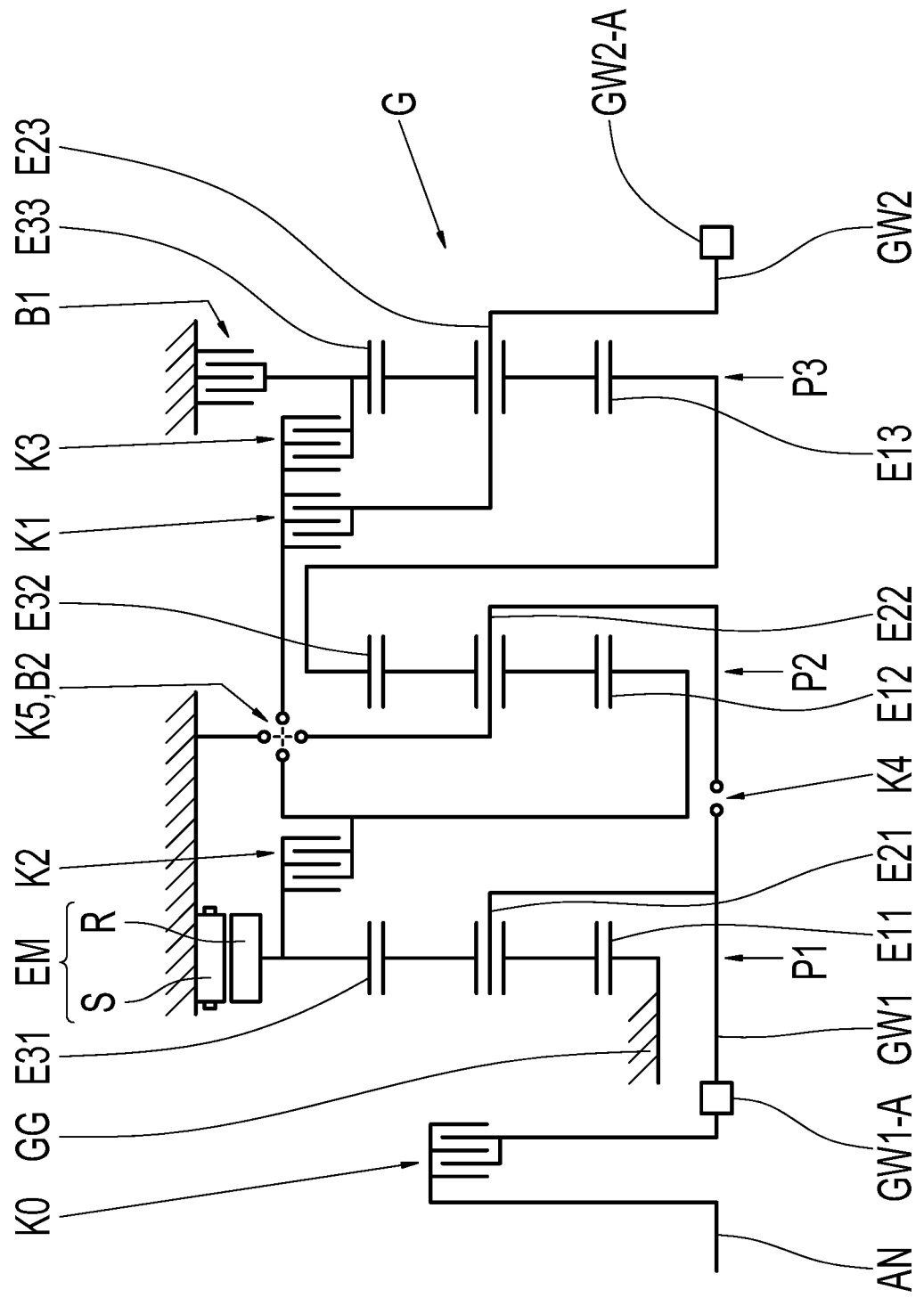
FIG. 4 schematically shows a transmission according to a third exemplary embodiment of the invention.

FIG. 4 schematically shows a transmission G according to a third exemplary embodiment of the invention, which essentially corresponds to the first exemplary embodiment represented in FIG. 1. The transmission G now includes a fifth shift element K4, a sixth shift element K5, and a seventh shift element B2. The input shaft GW1 is now no longer permanently connected to the second element E22 of the second planetary gear set P2, but rather is connectable via the fifth shift element K4. In this case, the fifth shift element K4 is designed as a form-fit shift element, by way of example. The first element E12 of the second planetary gear set P2 is connected to one shift-element half of the second shift element K1 by engaging the sixth shift element K5. By engaging the seventh shift element B2, the second element E22 of the second planetary gear set P2 is rotationally fixable. In this case, the sixth and the seventh shift elements K5, B2 are designed as a double-acting constant-mesh shift element which can be engaged in alternation. Therefore, either the sixth shift element K5 or the seventh shift element B2 is engaged, or neither of the two shift elements K5, B2 is engaged. The arrangement represented in FIG. 4 is to be considered merely as an example. A radially internal arrangement, preferably radially close to the first element E12, would also be possible. Due to such a radially internal arrangement, the effective diameter of the shift elements K5, B2 is reduced, and therefore their design complexity can be reduced. Such a design is also conceivable for the transmission G according to the second exemplary embodiment represented in FIG. 2. This variant is not represented in the figures, for the sake of clarity.

FIG. 5 shows a shift pattern for the transmission G according to the third exemplary embodiment which includes the fifth, sixth, and seventh shift elements K4, K5, B2. One reverse gear R1, in addition to the forward gears 1 to 6, is indicated in the rows of the shift pattern. In the columns, an X indicates which of the shift elements B1, K1, K2, K3, K4, K5, B2 is engaged in which forward gear 1 to 6 or reverse gear R1.

Figure 6:
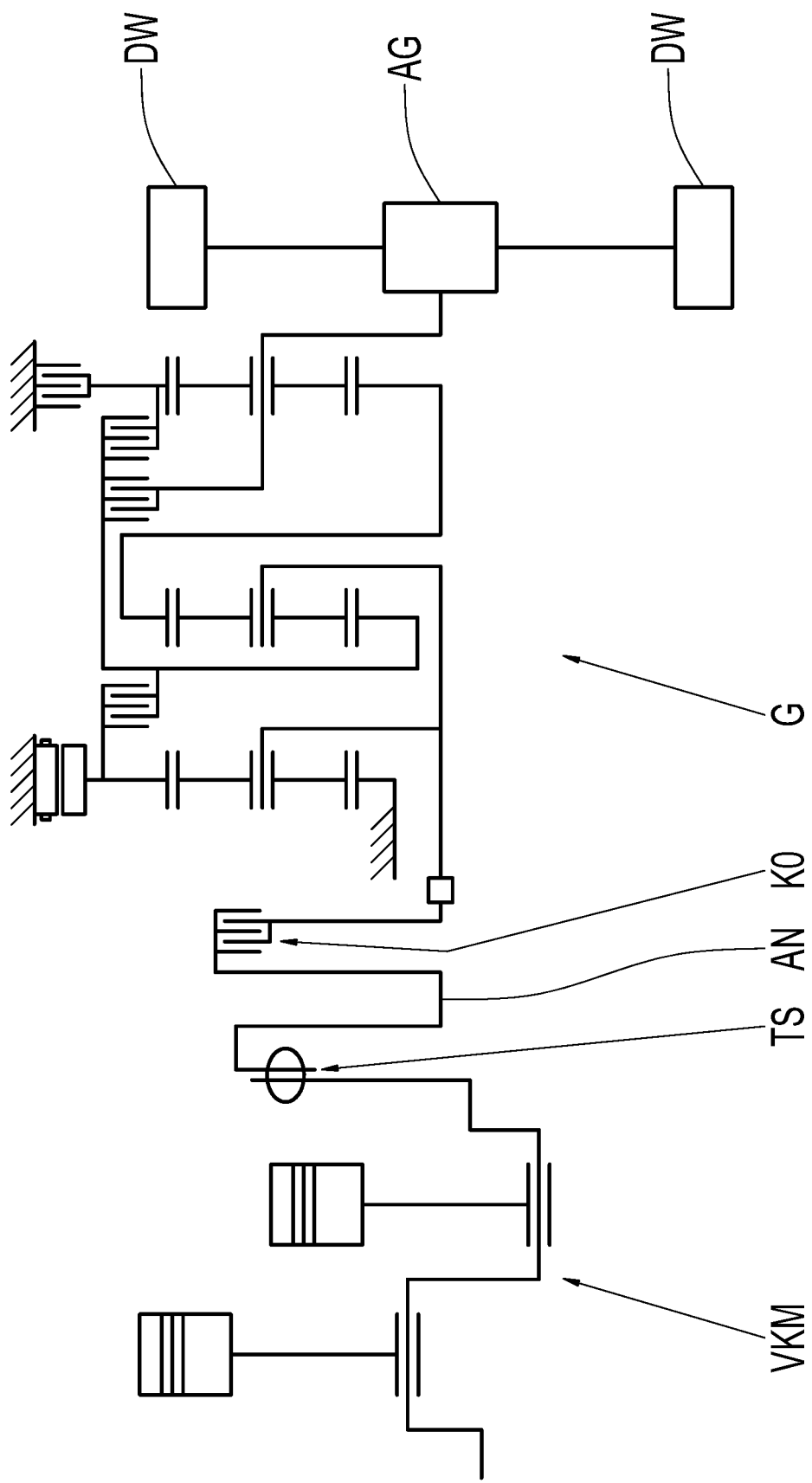
FIG. 6 shows a drive train of a motor vehicle.

FIG. 6 schematically shows a drive train of a motor vehicle. An internal combustion engine VKM is connected via a torsional vibration damper TS to the connecting shaft AN of the transmission G. The transmission G represented in FIG. 6 corresponds to the first exemplary embodiment of the invention represented in FIG. 1. This is to be considered merely as an example. As represented in FIG. 6, the internal combustion engine VKM is connectable to the input shaft GW1 of the transmission G via the torsional vibration damper TS via the separating clutch K0, or also directly. The transmission G could also be designed without an electric machine EM. The drive train could be designed with or without an electric machine EM in each of the present exemplary embodiments. The drive train could also include a hydrodynamic torque converter which is arranged, for example, between the separating clutch K0 and the input shaft GW1. Such a torque converter can also include a direct drive clutch. A person skilled in the art will freely configure the arrangement and spatial position of the individual components of the drive train depending on the external peripheral conditions. The output shaft GW2 is connected to an axle transmission AG, via which the power present at the output shaft GW2 is distributed to driving wheels DW of the motor vehicle.

The shift elements B1, K1, K2, K3 and the separating clutch K0 are represented as friction-locking shift elements in all exemplary embodiments. This is to be considered merely as an example. Each of the shift elements B1, K1, K2, K3, and the separating clutch K0 can also be designed as a form-fit shift element, wherein the first shift element B1 or the third shift element K2, in particular, are suitable therefor. A shift element acting as a starting component of the transmission G necessarily must be designed as a friction-locking shift element.

Modifications and variations can be made to the embodiments illustrated or described herein without departing from the scope and spirit of the invention as set forth in the appended claims.

REFERENCE CHARACTERS

G transmission
GG rotationally fixed component
P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
P3 third planetary gear set
E13 first element of the third planetary gear set
E23 second element of the third planetary gear set
E33 third element of the third planetary gear set
GW1 input shaft
GW2 output shaft
GW1-A external interface of the input shaft
GW2-A external interface of the output shaft
B1 first shift element
K1 second shift element
K2 third shift element
K3 fourth shift element
K4 fifth shift element
K5 sixth shift element
B2 seventh shift element
1 to 6 first to sixth forward gears
R1 reverse gear
S stator
R rotor
EM electric machine
VKM internal combustion engine
K0 separating clutch
DW wheels
AN connecting shaft
AG axle transmission
TS torsional vibration damper

The invention claimed is:

1. A transmission (G) for a motor vehicle, comprising:
an input shaft (GW1);
an output shaft (GW2);
a plurality of planetary gear sets (P1, P2, P3) having a first planetary gear set (P1), a second planetary gear set (P2), and a third planetary gear set (P3), each of the plurality of planetary gear sets (P1, P2, P3) is either a minus gear set or a plus gear set, each of the plurality of planetary gear sets (P1, P2, P3) comprises a first element (E11, E12, E13), a second element (E21, E22, E23), and a third element (E31, E32, E33), the first element (E11, E12, E13) being a sun gear of the respective planetary gear set (P1, P2, P3), the second element (E21, E22, E23) being a carrier of the respective planetary gear set (P1, P2, P3) when the respective planetary gear set (P1, P2, P3) is the minus gear set, the second element (E21, E22, E23) being a ring gear of the respective planetary gear set (P1, P2, P3) when the respective planetary gear set (P1, P2, P3) is the plus gear set, the third element (E31, E32, E33) being the ring gear of the respective planetary gear set (P1, P2, P3) when the respective planetary gear set (P1, P2, P3) is the minus gear set, the second element (E21, E22, E23) being the carrier of the respective planetary gear set (P1, P2, P3) when the respective planetary gear set (P1, P2, P3) is the plus gear set;
a plurality of shift elements (B1, K1, K2, K3) having a first shift element (B1), a second shift element (K1), a third shift element (K2), and a fourth shift element (K3);
wherein
the input shaft (GW1) is permanently connected to the second element (E21) of the first planetary gear set (P1),
the input shaft (GW1) is permanently connected or is connectable to the second element (E22) of the second planetary gear set (P2),
the output shaft (GW2) is permanently connected to the second element (E23) of the third planetary gear set (P3),
the first element (E11) of the first planetary gear set (P1) is permanently rotationally fixed,
the third element (E32) of the second planetary gear set (P2) is permanently connected to the first element (E13) of the third planetary gear set (P3),
the third element (E33) of the third planetary gear set (P3) is rotationally fixable by engaging the first shift element (B1),
the second shift element (K1) is arranged in an operative connection between the first element (E12) of the second planetary gear set (P2) and the output shaft (GW2),
the third element (E31) of the first planetary gear set (P1) is connectable to the first element (E12) of the second planetary gear set (P2) by engaging the third shift element (K2), and
the fourth shift element (K3) is arranged in an operative connection between the third element (E33) of the third planetary gear set (P3) and the first element (E12) of the second planetary gear set (P2).
2. The transmission (G) of claim 1, wherein:
six forward gears (1-6) are shiftable between the input shaft (GW1) and the output shaft (GW2) by selective engagement of the plurality of shift elements (B1, K1, K2, K3) in pairs;
a first forward gear (1) is formed by engaging the first shift element (B1) and the third shift element (K2);
a second forward gear (2) is formed by engaging the first shift element (B1) and the second shift element (K1);
a third forward gear (3) is formed by engaging the first shift element (B1) and the fourth shift element (K3);
a fourth forward gear (4) is formed by engaging the second shift element (K1) and the fourth shift element (K3);
a fifth forward gear (5) is formed by engaging the third shift element (K2) and the fourth shift element (K3); and
a sixth forward gear (6) is formed by engaging the second shift element (K1) and the third shift element (K2).
3. The transmission (G) of claim 1, wherein the first shift element (B1) is a form-fit shift element.
4. The transmission (G) of claim 1, further comprising a fifth shift element (K4), a sixth shift element (K5), and a seventh shift element (B2), wherein:
the input shaft (GW1) is connectable to the second element (E22) of the second planetary gear set (P2) by engaging the fifth shift element (K4);
the sixth shift element (K5) is arranged in an operative connection between the first element (E12) of the second planetary gear set (P2) and the second shift element (K2); and
the second element (E22) of the second planetary gear set (P2) is rotationally fixable by engaging the seventh shift element (B2).
5. The transmission (G) of claim 4, wherein the sixth and the seventh shift elements (K5, B2) are double-acting constant-mesh shift elements.
6. The transmission (G) of claim 4, wherein a reverse gear (R1) is formable between the input shaft (GW1) and the output shaft (GW2) by engaging the first shift element (B1), the third shift element (K2), and the seventh shift element (B2).
7. The transmission (G) of claim 4, wherein six forward gears (1-6) are shiftable between the input shaft (GW1) and the output shaft (GW2) by selective engagement of the plurality of shift elements (B1, K1, K2, K3) in pairs, and the fifth and the sixth shift elements (K4, K5) are engaged in the six forward gears (1-6).
8. The transmission (G) of claim 1, wherein an external interface (GW1-A) of the input shaft (GW1) and an external interface (GW2-A) of the output shaft (GW2) are arranged coaxial to each other and at opposite ends of the transmission (G), and the third planetary gear set (P3) is positioned axially furthest from the external interface (GW1-A) of the input shaft (GW1) relative to the first and second planetary gear sets (P1, P2).
9. The transmission (G) of claim 1, wherein an external interface (GW1-A) of the input shaft (GW1) and an external interface (GW2-A) of the output shaft (GW2) are arranged coaxial to each other (G), and the third planetary gear set (P3) is positioned axially closest to the external interface (GW1-A) of the input shaft (GW1) relative to the first and second planetary gear sets (P1, P2).
10. The transmission (G) of claim 1, wherein each of the plurality of planetary gear sets (P1, P2, P3) is the minus gear set.
11. The transmission (G) of claim 1, further comprising an electric motor (EM) with a rotationally fixed stator (S) and a rotor (R), wherein the rotor (R) is permanently connected either to the input shaft (GW1) or to the third element (E31) of the first planetary gear set (P1).
12. The transmission (G) of claim 11, further comprising a connecting shaft (AN) and a separating clutch (K0), wherein the connecting shaft (AN) is connectable to the input shaft (GW1) via the separating clutch (K0).
13. A drive train for a motor vehicle, comprising an internal combustion engine (VKM), the transmission (G) of claim 1, and an axle transmission (AG) connected to wheels (DW) of the motor vehicle, wherein the input shaft (GW1) or a connecting shaft (AN) of the transmission (G) is connected to the internal combustion engine (VKM) via a torsional vibration damper (TS) in a torsionally elastic manner, and the output shaft (GW2) of the transmission (G) is operatively connected, in a driving manner, to the axle transmission (AG).

\* \* \* \* \*